(12) United States Patent
Huang et al.

(10) Patent No.: US 10,616,154 B2
(45) Date of Patent: Apr. 7, 2020

(54) METHOD, SYSTEM, STORAGE MEDIUM FOR CREATING INSTANT MESSAGING DISCUSSION GROUP

(71) Applicant: TENCENT TECHNOLOGY (SHENZHEN) COMPANY LIMITED, Shenzhen (CN)

(72) Inventors: Pengfei Huang, Shenzhen (CN); Sheng Chen, Shenzhen (CN); Jian Zhong, Shenzhen (CN); Weijun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 258 days.

(21) Appl. No.: 14/730,156

(22) Filed: Jun. 3, 2015

(65) Prior Publication Data
US 2015/0271116 A1 Sep. 24, 2015

Related U.S. Application Data

(63) Continuation of application No. PCT/CN2013/085376, filed on Oct. 17, 2013.

(30) Foreign Application Priority Data

Dec. 3, 2012 (CN) .......................... 2012 1 0508873

(51) Int. Cl.
*G06F 15/16* (2006.01)
*H04L 12/58* (2006.01)
(Continued)

(52) U.S. Cl.
CPC ............ *H04L 51/046* (2013.01); *H04L 51/04* (2013.01); *H04L 63/08* (2013.01); *H04L 63/101* (2013.01); *H04L 67/14* (2013.01); *H04L 67/42* (2013.01)

(58) Field of Classification Search
CPC ....... H04L 51/046; H04L 51/04; H04L 63/08; H04L 63/101
See application file for complete search history.

(56) References Cited

U.S. PATENT DOCUMENTS 6,212,548 B1 * 4/2001 DeSimone .......... H04L 12/1813
709/204
8,611,509 B1 * 12/2013 Basart ................ H04M 3/4938
370/352
(Continued)

FOREIGN PATENT DOCUMENTS

| CN | 1832414 A | 9/2006 |
|---|---|---|
| CN | 1968117 A | 5/2007 |

(Continued)

OTHER PUBLICATIONS

The World Intellectual Property Organization (WIPO) International Search Report for PCT/CN2013/085376 dated Jan. 23, 2014.

*Primary Examiner* — Suraj M Joshi
*Assistant Examiner* — Jaren Means
(74) *Attorney, Agent, or Firm* — Anova Law Group, PLLC

(57) ABSTRACT

The present disclosure provides a method, system, client, server, and storage medium for creating an instant messaging discussion group. The method may include: sending, by a first client, a request for creating an instant messaging discussion group to a server, and receiving a creation identifier allocated by the server; broadcasting, by the first client, the creation identifier, so that another client other than the first client in an instant messaging application system initiates authentication from the server according to the creation identifier; and receiving, by the first client, a successfully authenticated client list delivered by the server, and selecting at least one client from the client list to create an instant messaging discussion group. The present disclosure provides improved process of creating an instant messaging discussion group, increases creation efficiency, and enhances convenience for a user to use an instant messaging application.

12 Claims, 8 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 2002/0082835 | A1* | 6/2002 | Squibbs | G06F 3/011 |
| | | | | 704/270 |
| 2003/0120925 | A1* | 6/2003 | Rose | G06Q 20/341 |
| | | | | 713/176 |
| 2005/0210394 | A1* | 9/2005 | Crandall | H04L 12/1831 |
| | | | | 715/752 |
| 2006/0235981 | A1* | 10/2006 | Westman | H04L 12/185 |
| | | | | 709/227 |
| 2009/0164587 | A1* | 6/2009 | Gavita | H04L 12/1818 |
| | | | | 709/206 |
| 2011/0265153 | A1* | 10/2011 | Guccione | G06F 21/33 |
| | | | | 726/5 |
| 2013/0097303 | A1* | 4/2013 | Gichana | H04L 63/0861 |
| | | | | 709/224 |

FOREIGN PATENT DOCUMENTS

| | | |
|---|---|---|
| JP | 2005-086624 A | 3/2005 |
| KR | 20050078160 A | 8/2005 |

\* cited by examiner

METHOD, SYSTEM, STORAGE MEDIUM FOR CREATING INSTANT MESSAGING DISCUSSION GROUP

RELATED APPLICATION

This application is a continuation of PCT Application No. PCT/CN2013/085376, filed on Oct. 17, 2013, which claims priority to Chinese Patent Application No. 201210508873.4, filed on Dec. 3, 2012, the entire contents of all of which are incorporated by reference.

FIELD OF THE TECHNOLOGY

The present disclosure generally relates to the field of Internet technologies, specifically to the field of instant messaging technologies and, more particularly, relates to a method, system, client, server, and storage medium for creating an instant messaging discussion group.

BACKGROUND OF THE DISCLOSURE

An instant messaging discussion group refers to a temporary chatting group in an instant messaging application for information exchanges among users. A client that initiates creation of an instant messaging discussion group is referred to as a Host client, and a client that is invited to join the instant messaging discussion group is referred to as a Client client. The Host client can create an instant messaging discussion group by selecting the Client client as desired from an instant messaging contact list of the Host client without needing to send verification information.

An existing process of creating an instant messaging discussion group includes that: a Host client selects Client clients one by one from an instant messaging contact list of the Host client to create an instant messaging discussion group to initiate chatting in the instant messaging discussion group. However, when a quantity of contacts in the instant messaging contact list of the Host client is large, the operation of selecting one by one from the Client clients is very complicated, thereby reducing efficiency of creating an instant messaging discussion group; and in addition, when there is a need to invite a client that is a non-contact of the Host client to join the instant messaging discussion group, the client may be selected as a Client client of the instant messaging discussion group only after an additional operation of adding the invited client as an instant messaging contact of the Host client is successfully performed.

Therefore, existing process for creating an instant messaging discussion group is complicated and time-consuming when a user uses the instant messaging application. There is a need to solve technical problems in the Internet and computer technology to provide a method, system, client, server, and storage medium for creating an instant messaging discussion group.

SUMMARY

According to one aspect of the present disclosure, a method, a system, a client, and a server for creating an instant messaging discussion group are provided. Process for creating an instant messaging discussion group can be simplified. Creation efficiency and convenience for a user to use an instant messaging application can be improved.

One aspect of the present disclosure provides a method for creating an instant messaging discussion group. The method includes: sending, by a first client, a request for creating an instant messaging discussion group to a server, and receiving a creation identifier allocated by the server; broadcasting, by the first client, the creation identifier, so that another client other than the first client in an instant messaging application system initiates authentication from the server according to the creation identifier; and receiving, by the first client, a successfully authenticated client list delivered by the server, and selecting at least one client from the client list to create an instant messaging discussion group.

Another aspect of the present disclosure provides a method for creating an instant messaging discussion group. The method includes: allocating, by a server, a creation identifier according to a request for creating an instant messaging discussion group sent by a first client and returning the creation identifier to the first client; authenticating, by the server when receiving a creation identifier sent by another client other than the first client in an instant messaging application system, the another client that sends the creation identifier; and sending, by the server, a successfully authenticated client list to the first client, so that the first client selects at least one client from the client list to create an instant messaging discussion group.

Another aspect of the present disclosure provides a method for creating an instant messaging discussion group. The method includes: obtaining a creation identifier broadcasted by a first client; sending the creation identifier to a server for authentication; and joining, if the authentication by the server is successful and as selected by the first client, an instant messaging discussion group created by the first client.

Another aspect of the present disclosure provides a client. The client includes: a request module, configured to send a request for creating an instant messaging discussion group to a server, and receive a creation identifier allocated by the server; a broadcast module, configured to broadcast the creation identifier, so that another client other than the client in an instant messaging application system initiates authentication from the server according to the creation identifier; and a creation module, configured to receive a successfully authenticated client list delivered by the server, and select at least one client from the client list to create an instant messaging discussion group.

Another aspect of the present disclosure provides a server. The server includes: a request responding module, configured to allocate a creation identifier according to a request for creating an instant messaging discussion group sent by a first client and return the creation identifier to the first client; an authentication module, configured to authenticate, when receiving a creation identifier sent by another client other than the first client in an instant messaging application system, the another client that sends the creation identifier; and a creation module, configured to send a successfully authenticated client list to the first client, so that the first client selects at least one client from the client list to create an instant messaging discussion group.

Another aspect of the present disclosure provides a client. The client includes: an obtaining module, configured to obtain a creation identifier broadcasted by a first client; an authentication module, configured to send the creation identifier to a server for authentication; and a joining module, configured to join, if the authentication by the server is successful and as selected by the first client, an instant messaging discussion group created by the first client.

Another aspect of the present disclosure provides an instant messaging application system. The instant messaging application system includes: the disclosed server and at least one of the disclosed clients.

As disclosed, a first client (e.g., a Host client) that initiates creation of an instant messaging discussion group requests a server for a creation identifier, and broadcasts the creation identifier, so that another client (or any other clients) other than the first client (including a client that is a non-contact of the first client) in an instant messaging application system can actively obtain the creation identifier, and initiate authentication from the server based on the actively obtained creation identifier; and the first client directly selects one or more clients from a successfully authenticated client list delivered by the server, to create an instant messaging discussion group.

Therefore, application of the aspects of the present disclosure not only simplifies an operating process, but also enables a client that is a non-contact of the first client to be directly added into the instant messaging discussion group (no need to be a contact of the first client), increasing creation efficiency, improving intelligence and competitiveness of an instant messaging application, and enhancing convenience for a user to use the instant messaging application.

BRIEF DESCRIPTION OF THE DRAWINGS

To describe technical solutions in embodiments of the present invention or in the existing technology more clearly, the following briefly introduces accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes embodiments of the present invention in detail with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present disclosure.

In the embodiments of the present invention, a client may include but is not limited to: devices such as a personal computer (PC), a tablet computer, a mobile phone, a personal digital assistant (PDA), an e-reader, a portable navigation device (PND), and a notebook computer. A first client may be any client in an instant messaging application system, where the first client may initiate creation of an instant messaging discussion group, and therefore the first client may be further referred to as a Host client.

Another client (or any other clients) other than the first client in the instant messaging application system refers to another client (or any other clients) in the instant messaging application system except the first client. When a client is selected by the first client (e.g., the Host client) to be considered as a member of the instant messaging discussion group, the selected client may be further referred to as a Client client. The Host client and the Client client may participate in a session and a discussion in the instant messaging discussion group. In the embodiments of the present invention, a creation identifier may be referred to as a Key, and refers to an identification (ID) used to create an instant messaging discussion group, and it is preferably a binary text.

The following describes a method for creating an instant messaging discussion group provided in the embodiments of the present invention in detail with reference to FIG. 1 to FIG. 7.

Figure 1:
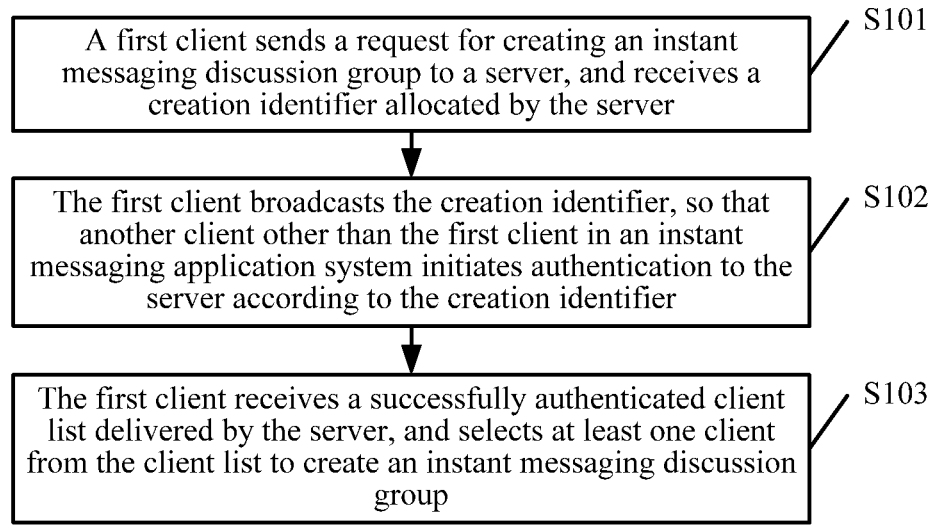
FIG. 1 is a flowchart of a method for creating an instant messaging discussion group according to an embodiment of the present invention.

FIG. 1 is a flowchart of a method for creating an instant messaging discussion group according to an embodiment of the present invention. This embodiment describes, from a Host client side, a process of creating an instant messaging discussion group, and the method for creating an instant messaging discussion group starts from step S101, and at least may include the following step S101 to step S103.

Step S101: A first client sends a request for creating an instant messaging discussion group to a server, and receives a creation identifier allocated by the server. This step is a process in which the first client requests the server for the creation identifier. Before creating the instant messaging discussion group, the first client first requests the server for an ID that is used to create the instant messaging discussion group.

Step S102: The first client broadcasts the creation identifier, so that another client (or any other clients) other than the first client in an instant messaging application system initiates authentication from the server according to the creation identifier. The another client other than the first client in the instant messaging application system can obtain the creation identifier broadcasted by the first client, and send the obtained creation identifier to the server for authentication.

Step S103: The first client receives a successfully authenticated client list delivered by the server, and selects at least one client from the client list to create an instant messaging discussion group.

In this embodiment of the present invention, for a client successfully authenticated by the server, the client has a creation identifier that is the same as that of the first client, and the client may be considered as a member of the instant messaging discussion group created by the first client. In this step, the first client may use all clients in the successfully authenticated client list delivered by the server as Client clients, so as to create the instant messaging discussion group to perform a session; or the first client may select some clients from the successfully authenticated client list delivered by the server, to be used as Client clients, so as to create the instant messaging discussion group to perform a session.

In this embodiment of the present invention, a first client (e.g., a Host client) that initiates creation of an instant messaging discussion group requests the server for a creation identifier, and broadcasts the creation identifier, so that another client other than the first client (including a client that is a non-contact of the first client) in an instant messaging application system can actively obtain the creation identifier, and initiate authentication from the server based on the actively obtained creation identifier. Therefore, the first client directly selects a client from a successfully authenticated client list delivered by the server, to create an instant messaging discussion group, which thereby not only simplifies an operating process, but also enables a client that is a non-contact of the first client to be directly added into the instant messaging discussion group, further increasing creation efficiency, improving intelligence and competitiveness of an instant messaging application, and enhancing convenience for a user to use the instant messaging application.

The foregoing describes a method for creating an instant messaging discussion group according to an embodiment of the present invention in detail.

According to another embodiment of the present invention, a method for creating an instant messaging discussion group is further provided.

Figure 2:
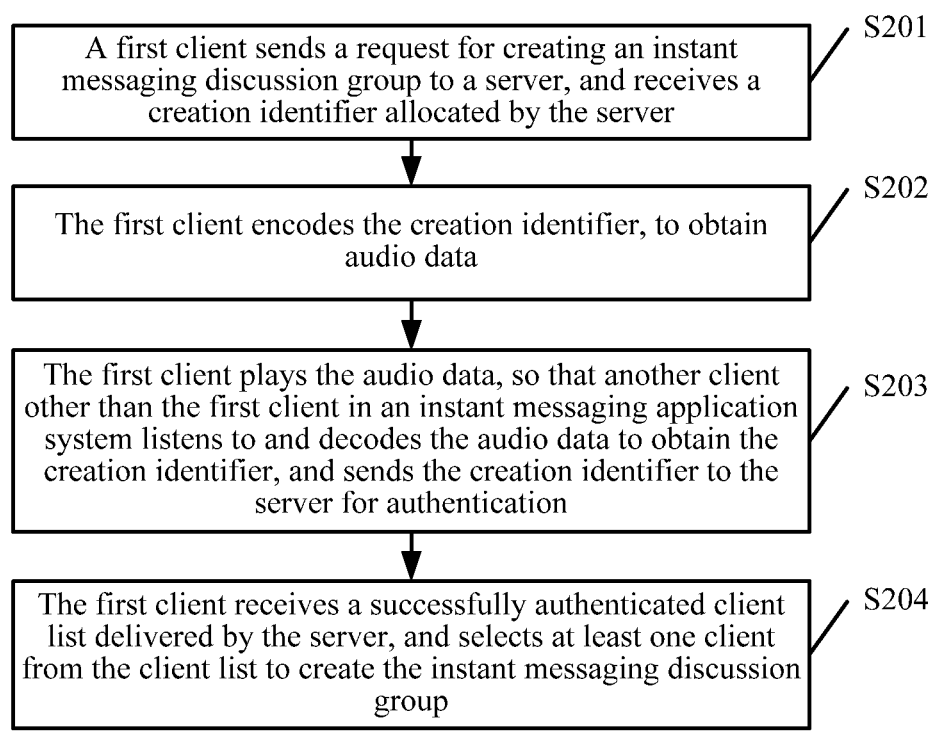
FIG. 2 is a flowchart of another method for creating an instant messaging discussion group according to an embodiment of the present invention.

FIG. 2 is a flowchart of another method for creating an instant messaging discussion group according to an embodiment of the present invention. This embodiment describes, from a Host client side, a process of creating an instant messaging discussion group, and the method for creating an instant messaging discussion group starts from step S201, and at least may include the following step S201 to step S204.

Step S201: A first client sends a request for creating an instant messaging discussion group to a server, and receives a creation identifier allocated by the server. For step S201 in this embodiment, reference may be made to step S101 in the embodiment shown in FIG. 1, and details are not provided herein.

Step S202: The first client encodes the creation identifier, to obtain audio data.

The first client may encode the creation identifier in a radio transmission encoding manner, to form the audio data. In this embodiment of the present invention, the audio data is general audio data, for example: Way (which is a multimedia audio format) audio data, and Moving Picture Experts Group Audio Layer III (Mp3) audio data, being played in various players.

Step S203: The first client plays the audio data, so that another client other than the first client in an instant messaging application system listens to and decodes the audio data to obtain the creation identifier, and sends the creation identifier to the server for authentication.

In this embodiment of the present invention, the first client may play the audio data by using a local player, for example: play the audio data by using a default player of an operating system of the first client, or play the audio data by using player software installed in the first client, or play the audio data by using a player function in the instant messaging application of the first client. The another client other than the first client in the instant messaging application system may listen to and obtain, by enabling a recording application of the another client or a tool such as a microphone, the audio data played by the first client, decode the audio data to obtain the creation identifier, and send the creation identifier to the server for authentication.

It can be understood that, sound transmission is limited by a distance, and therefore in this embodiment of the present invention, a client whose distance to the first client is within an effective distance range of the sound transmission can effectively hear the audio data played by the first client, and a client whose distance to the first client is outside the effective distance range of the sound transmission cannot effectively hear the audio data played by the first client.

It can be seen from this description that, this embodiment of the present invention particularly applies to a scenario in which the Host client creates an instant messaging discussion group with a nearby client, for example: if a user of the Host client is currently participating in an exhibition, another client (including a client that is a contact and/or a non-contact of the Host client) near the exhibition together with the Host client is collected by using this embodiment, to create an instant messaging discussion group, and initiate a session and a discussion about the exhibition, facilitating communication between users.

Step S204: The first client receives a successfully authenticated client list delivered by the server, and selects at least one client from the client list to create the instant messaging discussion group. For step S204 in this embodiment, reference may be made to step S103 in the embodiment shown in FIG. 1, and details are not provided herein.

In this embodiment of the present invention, a first client (that is, a Host client) that initiates creation of an instant messaging discussion group requests the server for a creation identifier, and broadcasts the creation identifier, so that another client other than the first client (including a client that is a non-contact of the first client) in an instant messaging application system can actively obtain the creation identifier, and initiate authentication from the server based on the actively obtained creation identifier. Therefore, the first client directly selects a client from a successfully authenticated client list delivered by the server, to create an instant messaging discussion group, which thereby not only simplifies an operating process, but also enables a client that is a non-contact of the first client to be directly added into the instant messaging discussion group, further increasing creation efficiency, improving intelligence and competitiveness of an instant messaging application, and enhancing convenience for a user to use the instant messaging application.

The foregoing describes a method for creating an instant messaging discussion group according to an embodiment of the present invention in detail.

According to still another embodiment of the present invention, a method for creating an instant messaging discussion group is further provided.

Figure 3:
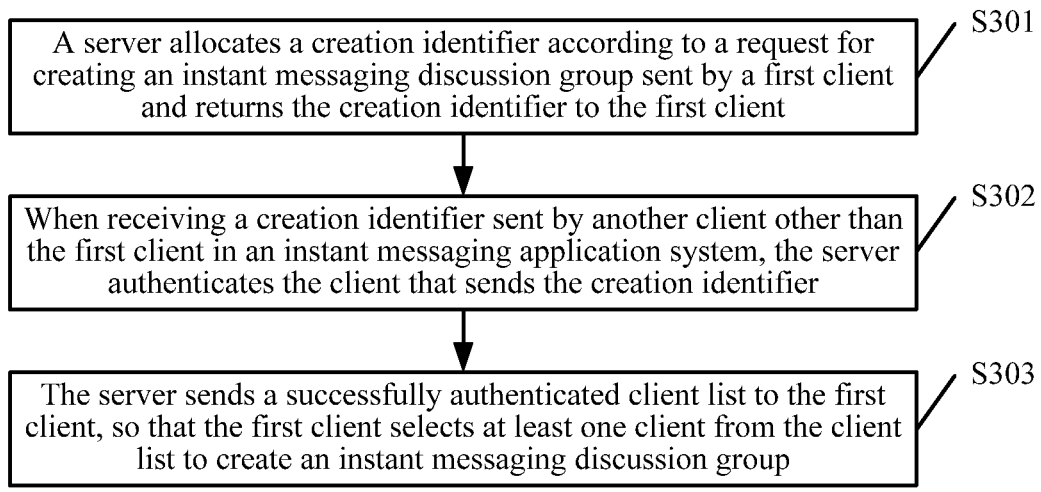
FIG. 3 is a flowchart of still another method for creating an instant messaging discussion group according to an embodiment of the present invention.

FIG. 3 is a flowchart of still another method for creating an instant messaging discussion group according to an embodiment of the present invention. This embodiment of the present invention describes, from a server side, a process of creating an instant messaging discussion group, and the method for creating an instant messaging discussion group starts from step S301, and at least may include the following step S301 to step S303.

Step S301: A server allocates a creation identifier according to a request for creating an instant messaging discussion group sent by a first client and returns the creation identifier to the first client. In this embodiment of the present invention, this step is a process in which the first client requests the server for the creation identifier. Before creating the instant messaging discussion group, the first client first requests the server for an ID that is used to create the instant messaging discussion group. After receiving the creation request from the first client, the server allocates the creation identifier to the first client, and returns the creation identifier to the first client.

Step S302: When receiving a creation identifier sent by another client other than the first client in an instant messaging application system, the server authenticates the another client that sends the creation identifier. In this embodiment of the present invention, the another client other than the first client in the instant messaging application system can obtain the creation identifier broadcasted by the first client, and send the obtained creation identifier to the server for authentication; and the server authenticates, according to the creation identifier sent by the another client, the client that initiates the creation identifier.

Step S303: The server sends a successfully authenticated client list to the first client, so that the first client selects at least one client from the client list to create an instant messaging discussion group.

In this embodiment of the present invention, for a client successfully authenticated by the server, the client has a creation identifier that is the same as that of the first client, and the client may be considered as a member of the instant messaging discussion group created by the first client. In this step, the server sends the successfully authenticated client list to the first client, and the first client may use all clients in the successfully authenticated client list delivered by the server as Client clients, so as to create the instant messaging discussion group to perform a session; or the first client may select some clients from the successfully authenticated client list delivered by the server, to be used as Client clients, so as to create the instant messaging discussion group to perform a session.

In this embodiment of the present invention, a server allocates a creation identifier to a first client (e.g., a Host client) that initiates creation of an instant messaging discussion group, and returns the creation identifier to the first client for broadcasting, so that another client other than the first client (including a client that is a non-contact of the first client) in an instant messaging application system can actively obtain the creation identifier, and initiate authentication from the server based on the actively obtained creation identifier.

Therefore, the server delivers a successfully authenticated client list to the first client, so that the first client may directly select a client from the successfully authenticated client list delivered by the server, to create an instant messaging discussion group, which thereby not only simplifies an operating process, but also enables the first client to directly add a client that is a non-contact of the first client into the instant messaging discussion group, further increasing creation efficiency, improving intelligence and competitiveness of an instant messaging application, and enhancing convenience for a user to use the instant messaging application.

The foregoing describes a method for creating an instant messaging discussion group according to an embodiment of the present invention in detail.

According to still another embodiment of the present invention, a method for creating an instant messaging discussion group is further provided.

Figure 4:
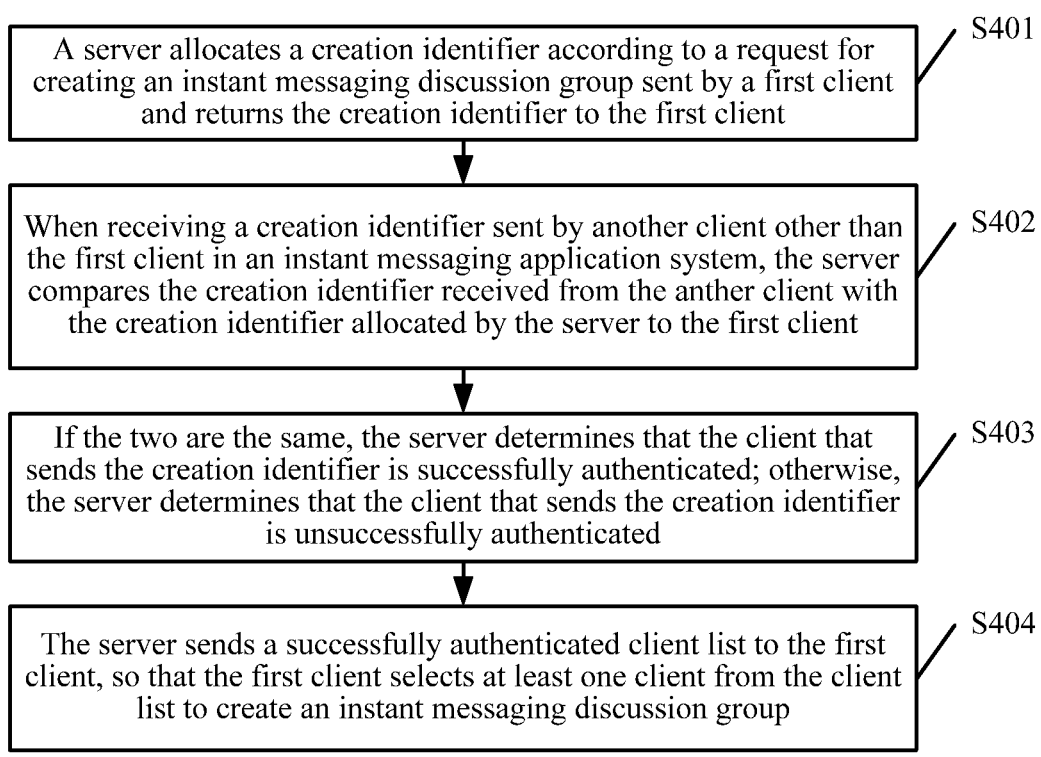
FIG. 4 is a flowchart of still another method for creating an instant messaging discussion group according to an embodiment of the present invention.

FIG. 4 is a flowchart of still another method for creating an instant messaging discussion group according to an embodiment of the present invention. This embodiment of the present invention describes, from a server side, a process of creating an instant messaging discussion group, and the method for creating an instant messaging discussion group starts from step S401, and at least may include the following step S401 to step S404.

Step S401: A server allocates a creation identifier according to a request for creating an instant messaging discussion group sent by a first client and returns the creation identifier to the first client. For step S401 in this embodiment, reference may be made to step S301 in the embodiment shown in FIG. 3, and details are not provided herein.

Step S402: When receiving a creation identifier sent by another client other than the first client in an instant messaging application system, the server compares the creation identifier received from the anther client with the creation identifier allocated by the server to the first client.

Step S403: If the creation identifier received from the another client and the creation identifier allocated by the server to the first client are the same, the server determines that the another client that sends the creation identifier is successfully authenticated; and when the creation identifiers of the another client and the first client are different, the server determines that the another client that sends the creation identifier is unsuccessfully authenticated.

In this embodiment of the present invention, the server performs comparison. If the creation identifier received from the another client and the creation identifier allocated by the server to the first client are the same, it indicates that the client has a creation identifier that is the same as that of the first client, the client may be considered as a member of the instant messaging discussion group created by the first client, and the server determines that the another client that sends the creation identifier is successfully authenticated. If the creation identifier received from the another client and the creation identifier allocated by the server to the first client are different, it indicates that the creation identifier that the client has does not match the creation identifier that the first client has, the client cannot be considered as a member of the instant messaging discussion group created by the first client, and the server determines that the another client that sends the creation identifier is unsuccessfully authenticated. It can be seen from this description that, in this embodiment, the background of the server collects and filters a member of the instant messaging discussion group for the first client, simplifying an operation for the first client to select a member.

Step S404: The server sends a successfully authenticated client list to the first client, so that the first client selects at least one client from the client list to create an instant messaging discussion group. For step S404 in this embodiment, reference may be made to step S303 in the embodiment shown in FIG. 3, and details are not provided herein.

In this embodiment of the present invention, the server allocates a creation identifier to the first client (that is, a Host client) that initiates creation of an instant messaging discussion group, and returns the creation identifier to the first client for broadcasting, so that another client other than the first client (including a client that is a non-contact of the first client) in an instant messaging application system can actively obtain the creation identifier, and initiate authentication from the server based on the actively obtained creation identifier.

Therefore, the server delivers a successfully authenticated client list to the first client, so that the first client may directly select a client from the successfully authenticated client list delivered by the server, to create an instant messaging discussion group, which thereby not only simplifies an operating process, but also enables the first client to directly add a client that is a non-contact of the first client into the instant messaging discussion group, further increasing creation efficiency, improving intelligence and competitiveness of an instant messaging application, and enhancing convenience for a user to use the instant messaging application.

The foregoing describes a method for creating an instant messaging discussion group according to an embodiment of the present invention in detail.

According to still another embodiment of the present invention, a method for creating an instant messaging discussion group is further provided.

Figure 5:
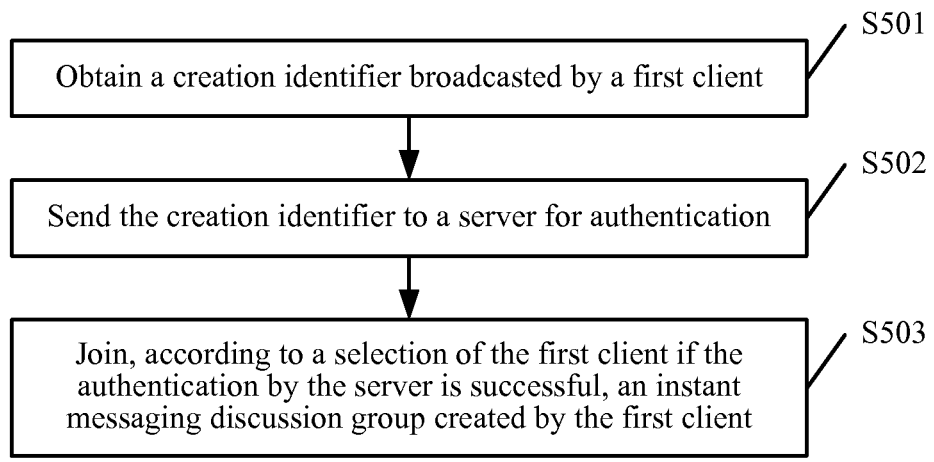
FIG. 5 is a flowchart of still another method for creating an instant messaging discussion group according to an embodiment of the present invention.

FIG. 5 is a flowchart of still another method for creating an instant messaging discussion group according to an embodiment of the present invention. This embodiment of the present invention describes, from a side of another client other than a Host client in an instant messaging application system, a process of creating an instant messaging discussion group, and the method for creating an instant messaging discussion group starts from step S501, and at least may include the following step S501 to step S503.

Step S501: Obtain a creation identifier broadcasted by a first client. In an embodiment of the present invention, the first client broadcasts a creation identifier of the instant messaging discussion group that is allocated by a server to the first client, and in this step, the another client other than the Host client in the instant messaging application system may obtain the creation identifier broadcasted by the first client.

Step S502: Send the creation identifier to a server for authentication.

In this embodiment of the present invention, after receiving the creation identifier, the server compares the creation identifier with the creation identifier allocated by the server to the first client. When the creation identifiers of the another client and the first client are same, it indicates that the client has a creation identifier that is the same as that of the first client, the client may be considered as a member of the instant messaging discussion group created by the first client, and the server determines that the client is successfully authenticated. If the two are different, it indicates that a creation identifier that the client has does not match the creation identifier that the first client has, the client cannot be considered as a member of the instant messaging discussion group created by the first client, and the server determines that the client is unsuccessfully authenticated.

Step S503: Join, if the authentication by the server is successful and as selected by the first client, an instant messaging discussion group created by the first client.

In this embodiment of the present invention, after the client is successfully authenticated, if the first client selects the client as a Client client of the instant messaging discussion group, the client becomes a member of the instant messaging discussion group, and joins the instant messaging discussion group to perform a discussion and a session.

In this embodiment of the present invention, another client (including a client that is a non-contact of the first client) other than a first client (that is, a Host client) that initiates creation of an instant messaging discussion group actively obtains a creation identifier broadcasted by the first client, and initiates authentication from the server based on the actively obtained creation identifier. After the authentication succeeds, the instant messaging discussion group is directly joined according to a selection of the first client, thereby not only simplifying an operating process, and enabling the first client to directly add a client that is a non-contact of the first client into the instant messaging discussion group, but also increasing creation efficiency, improving intelligence and competitiveness of an instant messaging application, and enhancing convenience for a user to use the instant messaging application.

The foregoing describes a method for creating an instant messaging discussion group according to an embodiment of the present invention in detail.

According to another embodiment of the present invention, a method for creating an instant messaging discussion group is further provided.

Figure 6:
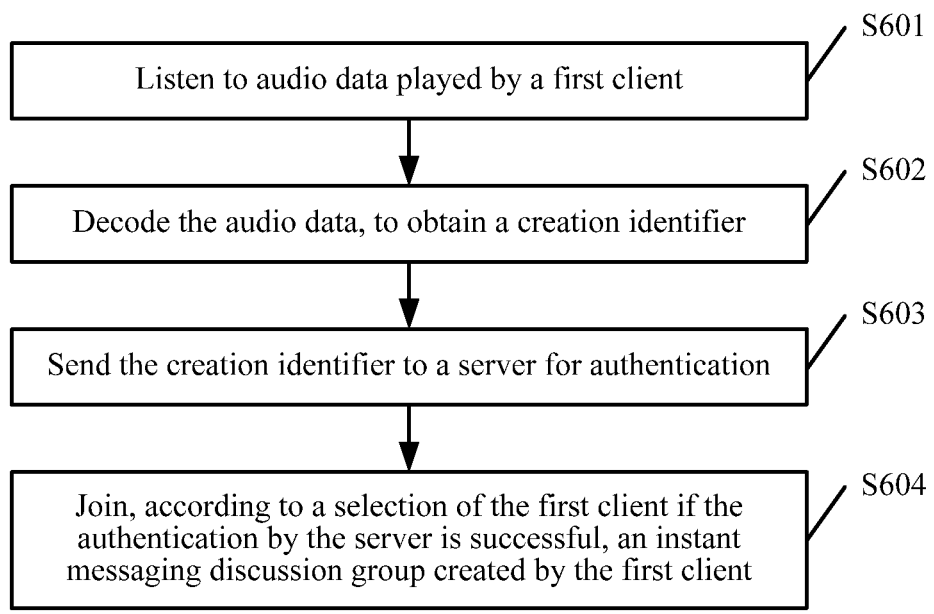
FIG. 6 is a flowchart of still another method for creating an instant messaging discussion group according to an embodiment of the present invention.

FIG. 6 is a flowchart of still another method for creating an instant messaging discussion group according to an embodiment of the present invention. This embodiment of the present invention describes, from a side of another client other than a Host client in an instant messaging application system, a process of creating an instant messaging discussion group, and the method for creating an instant messaging discussion group starts from step S601, and at least may include the following step S601 to step S604.

Step S601: Listen to audio data played by a first client.

In this embodiment of the present invention, the first client encodes a creation identifier allocated by a server to form audio data, and locally plays the audio data. In this step, the client may listen to and obtain, by enabling a recording application of the client or a tool such as a microphone, the audio data played by the first client. It can be understood that, sound transmission is limited by a distance, and therefore in this embodiment of the present invention, a client whose distance to the first client is within an effective distance range of the sound transmission can effectively hear the audio data played by the first client, and a client whose distance to the first client is outside the effective distance range of the sound transmission cannot effectively hear the audio data played by the first client. It can be seen from this description that, this embodiment of the present invention particularly applies to a scenario in which the Host client creates an instant messaging discussion group with a nearby client, for example: a client near the Host client can quickly join, by listening to the audio data, the instant messaging discussion group created by the Host client, and initiate a session and a discussion about an exhibition, facilitating communication between users.

Step S602: Decode the audio data, to obtain a creation identifier.

In this embodiment of the present invention, the first client encodes the creation identifier in a radio transmission encoding manner, to form the audio data. Therefore, in this step, the client may decode, in a radio transmission decoding manner, the heard audio data, to obtain the creation identifier. It can be understood that, methods for decoding and encoding used by the first client may be reversible.

Step S603: Send the creation identifier to a server for authentication.

Step S604: Join, if the authentication by the server is successful and as selected by the first client, an instant messaging discussion group created by the first client. For steps S603 to S604 in this embodiment, reference may be made to steps S502 to S503 in the embodiment shown in FIG. 5, and details are not provided herein.

In this embodiment of the present invention, another client (including a client that is a non-contact of the first client) other than a first client (that is, a Host client) that initiates creation of an instant messaging discussion group actively obtains a creation identifier broadcasted by the first client, and initiates authentication from the server based on the actively obtained creation identifier. After the authentication succeeds, the instant messaging discussion group is directly joined according to a selection of the first client, thereby not only simplifying an operating process, and enabling the first client to directly add a client that is a non-contact of the first client into the instant messaging discussion group, but also increasing creation efficiency, improving intelligence and competitiveness of an instant messaging application, and enhancing convenience for a user to use the instant messaging application.

The foregoing describes a method for creating an instant messaging discussion group according to an embodiment of the present invention in detail.

According to still another embodiment of the present invention, a method for creating an instant messaging discussion group is further provided.

Figure 7:
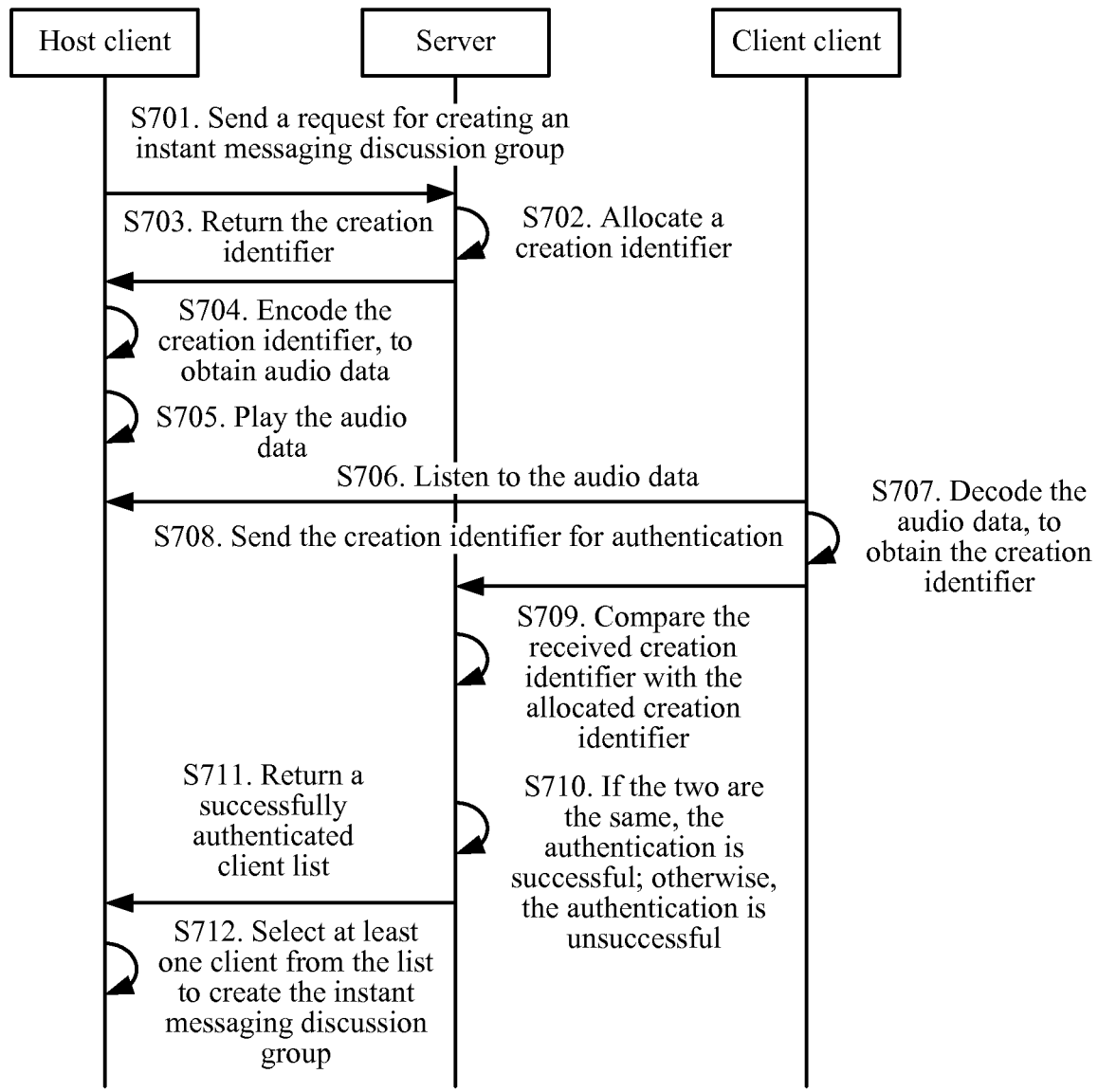
FIG. 7 is a flowchart of still another method for creating an instant messaging discussion group according to an embodiment of the present invention.

FIG. 7 is a flowchart of still another method for creating an instant messaging discussion group according to an embodiment of the present invention. This embodiment of the present invention describes, from a process of interaction among a Host client, a server, and a Client client, a process of creating an instant messaging discussion group, and in this embodiment, the Client client is any client other than the Host client in an instant messaging application system. The method for creating an instant messaging discussion group starts from step S701, and at least may include the following steps S701 to step S712.

Step S701: A Host client sends a request for creating an instant messaging discussion group to a server.

Step S702: The server allocates a creation identifier according to the request for creating an instant messaging discussion group sent by the Host client.

Step S703: The server returns the allocated creation identifier to the Host client.

Step S704: The Host client encodes the creation identifier, to obtain audio data.

Step S705: The Host client plays the audio data.

Step S706: A Client client listens to the audio data played by the Host client.

Step S707: The Client client decodes the audio data, to obtain the creation identifier.

Step S708: The Client client sends the creation identifier to the server for authentication.

Step S709: The server compares the creation identifier received from the Client client with the creation identifier allocated by the server to the Host client.

Step S710: When the creation identifiers of the another client and the first client are same, the server determines that the Client client that sends the creation identifier is successfully authenticated; and when the creation identifiers of the another client and the first client are different, the server determines that the Client client that sends the creation identifier is unsuccessfully authenticated.

Step S711: The server sends a successfully authenticated client list to the Host client; and in this step, the server may further send the client list to a client that is successfully authenticated.

Step S712: The Host client receives the successfully authenticated client list delivered by the server, and selects at least one client from the client list as the Client client to create the instant messaging discussion group. It should be noted that, after the instant messaging discussion group is created, the server synchronizes a member list of the instant messaging discussion group to member clients of the instant messaging discussion group.

In this embodiment of the present invention, the Host client can quickly create an instant messaging discussion group with the Client client by using a sound, to initiate a session and a discussion, which not only simplifies an operating process, and improves an existing process of creating an instant messaging discussion group, but also increases creation efficiency, and enhances convenience for a user to use an instant messaging application.

The foregoing describes a method for creating an instant messaging discussion group according to an embodiment of the present invention in detail.

According to another embodiment of the present invention, a client is provided.

Figure 8:
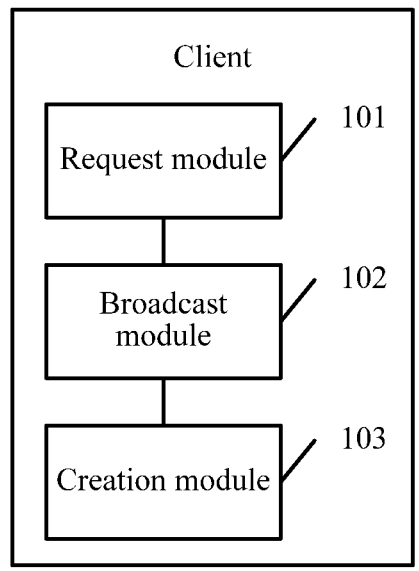
FIG. 8 is a schematic structural diagram of a client according to an embodiment of the present invention.
Figure 9:
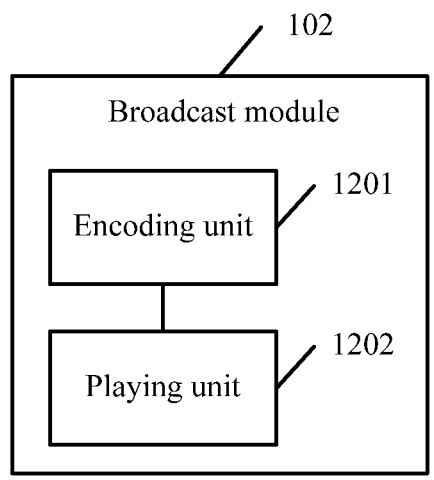
FIG. 9 is a schematic structural diagram according to an embodiment of a broadcast module shown in FIG. 8.

The following describes clients in embodiments of the present invention in detail with reference to FIG. 8 and FIG. 9, and the following client particularly refers to a Host client that initiates creation of an instant messaging discussion group. It should be noted that, the following client may be applied to the foregoing methods.

FIG. 8 is a schematic structural diagram of a client according to an embodiment of the present invention. The client in this embodiment of the present invention may be a Host client, where the client may include: a request module 101, a broadcast module 102, and a creation module 103.

The request module 101 is configured to send a request for creating an instant messaging discussion group to a server, and receive a creation identifier allocated by the server.

The broadcast module 102 is configured to broadcast the creation identifier, so that another client other than the client in an instant messaging application system initiates authentication from the server according to the creation identifier. In this embodiment of the present invention, the another client other than the first client in the instant messaging application system can obtain the creation identifier broadcasted by the first client, and send the obtained creation identifier to the server for authentication.

The creation module 103 is configured to receive a successfully authenticated client list delivered by the server, and select at least one client from the client list to create an instant messaging discussion group.

In this embodiment of the present invention, for a client successfully authenticated by the server, it indicates that the client has a creation identifier that is the same as that of the first client, and the client may be considered as a member of the instant messaging discussion group created by the first client. The creation module 103 may use all clients in the successfully authenticated client list delivered by the server as Client clients, and create the instant messaging discussion group to perform a session; or the creation module 103 may select some clients from the successfully authenticated client list delivered by the server, to be used as Client clients, and create the instant messaging discussion group to perform a session.

FIG. 9 is a schematic structural diagram according to the embodiment of the broadcast module shown in FIG. 8. The broadcast module 102 may include: an encoding unit 1201 and a playing unit 1202.

The encoding unit 1201 is configured to encode the creation identifier, to obtain audio data.

In this embodiment of the present invention, the encoding unit 1201 may encode the creation identifier in a radio transmission encoding manner, to form the audio data. Preferably, the audio data is general audio data, for example: Way audio data and Mp3 audio data, being played in various players.

The playing unit 1202 is configured to play the audio data, so that another client other than the first client in an instant messaging application system listens to and decodes the audio data to obtain the creation identifier, and sends the creation identifier to the server for authentication.

In this embodiment of the present invention, the playing unit 1202 may play the audio data by using a local player, for example: play the audio data by using a default player of an operating system of the first client, or play the audio data by using player software installed in the first client, or play the audio data by using a player function in the instant messaging application of the first client.

It should be noted that, a structure and a function of the foregoing client may be specifically implemented by using the methods in the foregoing method embodiments. For the specific implementation process, reference may be made to description in the foregoing method embodiments, and details are not provided herein.

In another embodiment of the present invention, the methods for creating an instant messaging discussion group shown in FIG. 1 and FIG. 2 may be methods for creating an instant messaging discussion group that are executed by the units in the client that is shown in FIG. 8 and FIG. 9. For example, step S101 shown in FIG. 1 and step S201 shown in FIG. 2 may be performed by the request module 101 shown in FIG. 8. Step S102 shown in FIG. 1 may be performed by the broadcast module 102 shown in FIG. 8. Step S103 shown in FIG. 1 and step S204 shown in FIG. 2 may be performed by the creation module 103 shown in FIG. 8. Step S202 shown in FIG. 2 may be performed by the encoding unit 1201 shown in FIG. 9. Step S203 shown in FIG. 2 may be performed by the playing unit 1202 shown in FIG. 9.

In another embodiment of the present invention, units in the client that are shown in FIG. 8 may be separately or all combined into one or several other units for composition, or some unit (units) thereof may be further divided into multiple functionally smaller subunits for composition. This may implement same operations, without affecting achievement of technical effects of embodiments of the present invention. The foregoing units are divided based on logic functions, and in an actual application, a function of one unit may also be implemented by multiple subunits, or functions of multiple subunits may be implemented by one unit. In another embodiment of the present invention, the client may also include another module. However, in an actual application, these functions may also be implemented with assistance from another unit, and may be implemented in cooperation by multiple units.

According to another embodiment of the present invention, the client shown in FIG. 8 and FIG. 9 may be constructed, and the method for creating an instant messaging discussion group according to an embodiment of the present invention may be implemented by running, on a general-purpose computing device such as a computer that includes processing components and storage components such as a central processing unit (CPU), a random access memory (RAM), and a read-only memory (ROM), a computer program (including program code) that can execute the methods for creating an instant messaging discussion group that are shown in FIG. 1 and FIG. 2. The computer program may be stored on a computer readable storage medium (or a non-transitory computer readable storage medium), and configured in the foregoing computing device by using the computer readable storage medium, and run in the foregoing computing device.

In this embodiment of the present invention, a first client (e.g., a Host client) that initiates creation of an instant messaging discussion group requests the server for a creation identifier, and broadcasts the creation identifier, so that another client other than the first client (including a client that is a non-contact of the first client) in an instant messaging application system can actively obtain the creation identifier, and initiate authentication from the server based on the actively obtained creation identifier. The first client directly selects a client from a successfully authenticated client list delivered by the server, to create an instant messaging discussion group, which thereby not only simplifies an operating process, and enables a client that is a non-contact of the first client to be directly added into the instant messaging discussion group, but also increases creation efficiency, improves intelligence and competitiveness of an instant messaging application, and enhances convenience for a user to use the instant messaging application.

The foregoing describes a client according to an embodiment of the present invention in detail.

According to another embodiment of the present invention, a server is provided.

Figure 10:
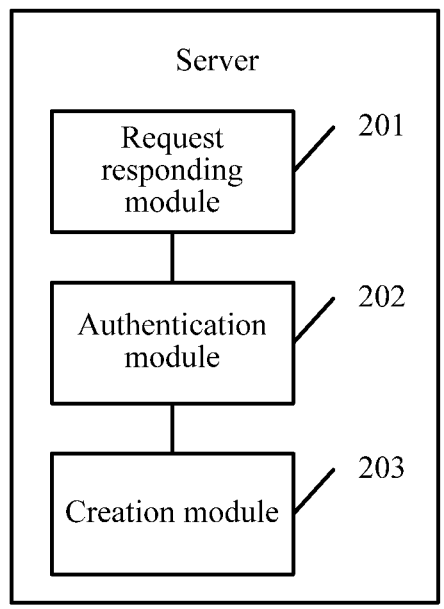
FIG. 10 is a schematic structural diagram of a server according to an embodiment of the present invention.
Figure 11:
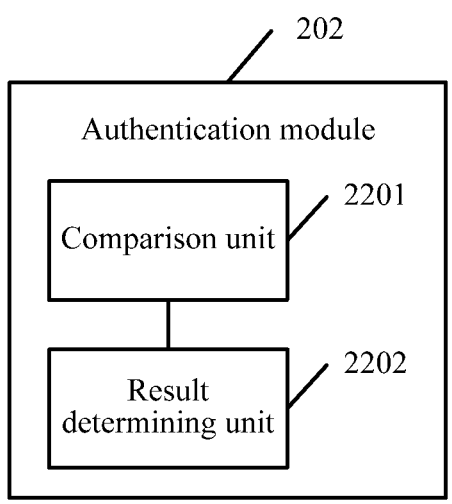
FIG. 11 is a schematic structural diagram according to an embodiment of an authentication module shown in FIG. 10.

The following describes a server in embodiments of the present invention in detail with reference to FIG. 10 and FIG. 11. It should be noted that, the following server may be applied to the foregoing methods.

FIG. 10 is a schematic structural diagram of a server according to an embodiment of the present invention. The server may include: a request responding module 201, an authentication module 202, and a creation module 203.

The request responding module 201 is configured to allocate a creation identifier according to a request for creating an instant messaging discussion group sent by a first client and return the creation identifier to the first client.

The authentication module 202 is configured to authenticate, when receiving a creation identifier sent by another client other than the first client in an instant messaging application system, the another client that sends the creation identifier.

In this embodiment of the present invention, the another client other than the first client in the instant messaging application system can obtain the creation identifier broadcasted by the first client, and send the obtained creation identifier to the server for authentication. The authentication module 202 authenticates, according to the creation identifier sent by the another client, the client that initiates the creation identifier.

The creation module 203 is configured to send a successfully authenticated client list to the first client, so that the first client selects at least one client from the client list to create an instant messaging discussion group.

In this embodiment of the present invention, for a client successfully authenticated by the server, it indicates that the client has a creation identifier that is the same as that of the first client, and the client may be considered as a member of the instant messaging discussion group created by the first client. The creation module 203 sends a successfully authenticated client list to the first client, so that the first client selects all clients from the client list, to be used as Client clients, and creates an instant messaging discussion group to perform a session; and in another embodiment of the present invention, the creation module 203 sends a successfully authenticated client list to the first client, so that the first client selects some clients from the client list, to be used as Client clients, and creates an instant messaging discussion group to perform a session.

FIG. 11 is a schematic structural diagram according to the embodiment of the authentication module shown in FIG. 10. The authentication module 202 includes: a comparison unit 2201 and a result determining unit 2202.

The comparison unit 2201 is configured to compare the creation identifier received from the another client with the creation identifier allocated by the request responding module 201 to the first client.

The result determining unit 2202 is configured to determine, when the creation identifier received from the another client and the creation identifier allocated by the request responding module 201 to the first client are the same, that the another client that sends the creation identifier is successfully authenticated; and when the creation identifiers of the another client and the first client are different, determine that the another client that sends the creation identifier is unsuccessfully authenticated.

In this embodiment of the present invention, the comparison unit 2201 performs comparison. If the creation identifier received from the another client and the creation identifier allocated by the server to the first client are the same, it indicates that the client has a creation identifier that is the same as that of the first client, the client may be considered as a member of the instant messaging discussion group created by the first client, and the result determining unit 2202 determines that the another client that sends the creation identifier is successfully authenticated. If the creation identifier received from the another client and the creation identifier allocated by the server to the first client are different, it indicates that the creation identifier that the client has does not match the creation identifier that the first client has, the client cannot be considered as a member of the instant messaging discussion group created by the first client, and the result determining unit 2202 determines that the another client that sends the creation identifier is unsuccessfully authenticated. It can be seen from this description that, in this embodiment, the background of the server collects and filters a member of the instant messaging discussion group for the first client, effectively simplifying an operation for the first client to select a member.

It should be noted that, a structure and a function of the foregoing server may be specifically implemented by using the methods in the foregoing method embodiments. For the specific implementation process, reference may be made to description in the foregoing method embodiments, and details are not provided herein.

In another embodiment of the present invention, the methods for creating an instant messaging discussion group shown in FIG. 3 and FIG. 4 may be methods for creating an instant messaging discussion group that are executed by the units in the server that is shown in FIG. 10 and FIG. 11. For example, step S301 shown in FIG. 3 and step S401 shown in FIG. 4 may be performed by the request responding module 201 shown in FIG. 10. Step S302 shown in FIG. 3 may be performed by the authentication module 202 shown in FIG. 10. Step S303 shown in FIG. 3 and step S404 shown in FIG. 4 may be performed by the creation module 203 shown in FIG. 10. Step S402 shown in FIG. 4 may be performed by the comparison unit 2201 shown in FIG. 11. Step S403 shown in FIG. 4 may be performed by the result determining unit 2202 shown in FIG. 11.

In another embodiment of the present invention, units in the server that are shown in FIG. 8 may be separately or all combined into one or several other units for composition, or some unit (units) thereof may be further divided into multiple functionally smaller subunits for composition. This may implement same operations, without affecting achievement of technical effects of embodiments of the present invention. The foregoing units are divided based on logic functions, and in an actual application, a function of one unit may also be implemented by multiple subunits, or functions of multiple subunits may be implemented by one unit. In another embodiment of the present invention, the server may also include another module. However, in an actual application, these functions may also be implemented with assistance from another unit, and may be implemented in cooperation by multiple units.

According to another embodiment of the present invention, the server shown in FIG. 10 and FIG. 11 may be constructed, and the method for creating an instant messaging discussion group according to an embodiment of the present invention may be implemented by running, on a general-purpose computing device such as a computer that includes processing components and storage components such as a central processing unit (CPU), a random access memory (RAM), and a read-only memory (ROM), a computer program (including program code) that can execute the methods for creating an instant messaging discussion group that are shown in FIG. 3 and FIG. 4. The computer program may be stored on a computer readable storage medium (or a non-transitory computer readable storage medium), and configured in the computing device by using the computer readable storage medium, and run in the foregoing computing device.

In this embodiment of the present invention, a server allocates a creation identifier to a first client (that is, a Host client) that initiates creation of an instant messaging discussion group, and returns the creation identifier to the first client for broadcasting, so that another client other than the first client (including a client that is a non-contact of the first client) in an instant messaging application system can actively obtain the creation identifier, and initiate authentication from the server based on the actively obtained creation identifier. The server delivers a successfully authenticated client list to the first client, so that the first client may directly select a client from the successfully authenticated client list delivered by the server, to create an instant messaging discussion group, which thereby not only simplifies an operating process, but also enables the first client to directly add a client that is a non-contact of the first client into the instant messaging discussion group, increasing creation efficiency, improving intelligence and competitiveness of an instant messaging application, and enhancing convenience for a user to use the instant messaging application.

The foregoing describes a server according to an embodiment of the present invention in detail.

According to another embodiment of the present invention, a client is further provided.

Figure 12:
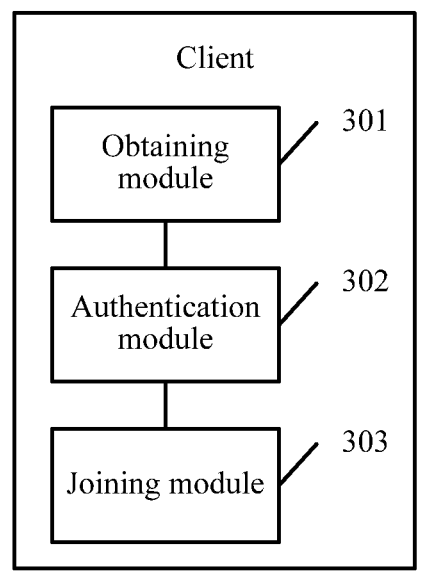
FIG. 12 is a schematic structural diagram of another client according to an embodiment of the present invention.
Figure 13:
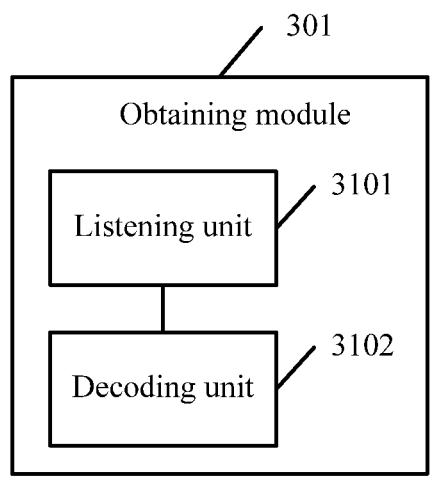
FIG. 13 is a schematic structural diagram according to an embodiment of an obtaining module shown in FIG. 12.

The following describes clients provided in embodiments of the present invention in detail with reference to FIG. 12 and FIG. 13, and the following client particularly refers to any client other than a Host client in an instant messaging application system. It should be noted that, the following client may be applied to the foregoing methods.

FIG. 12 is a schematic structural diagram of another client according to an embodiment of the present invention. The client in this embodiment of the present invention may be any client other than a Host client in an instant messaging application system, where the client may include: an obtaining module 301, an authentication module 302, and a joining module 303.

The obtaining module 301 is configured to obtain a creation identifier broadcasted by a first client.

The authentication module 302 is configured to send the creation identifier to a server for authentication.

The joining module 303 is configured to join, if the authentication by the server is successful and as selected by the first client, an instant messaging discussion group created by the first client.

FIG. 13 is a schematic structural diagram according to the embodiment of the obtaining module shown in FIG. 12. The obtaining module 301 may include: a listening unit 3101 and a decoding unit 3102.

The listening unit 3101 is configured to listen to audio data played by the first client.

In this embodiment of the present invention, the first client encodes a creation identifier allocated by a server to form audio data, and locally plays the audio data. The listening unit 3101 may listen to and obtain, by enabling a recording application of the client or a tool such as a microphone, the audio data played by the first client. It can be understood that, sound transmission is limited by a distance, and therefore in this embodiment of the present invention, a client whose distance to the first client is within an effective distance range of the sound transmission can effectively hear the audio data played by the first client, and a client whose distance to the first client is outside the effective distance range of the sound transmission cannot effectively hear the audio data played by the first client. It can be seen from this description that, this embodiment of the present invention particularly applies to a scenario in which the Host client creates an instant messaging discussion group with a nearby client, for example: a client near the Host client can quickly join, by listening to the audio data, the instant messaging discussion group created by the Host client, facilitating communication between users.

The decoding unit 3102 is configured to decode the audio data, to obtain the creation identifier.

The first client encodes the creation identifier in a radio transmission encoding manner, to form the audio data. Therefore, in this embodiment of the present invention, the decoding unit 3102 may decode, in a radio transmission decoding manner, the heard audio data, to obtain the creation identifier. It can be understood that, the decoding manner herein and the encoding manner used by the first client are reversible.

It should be noted that, a structure and a function of the foregoing client may be specifically implemented by using the methods in the foregoing method embodiments. For the specific implementation process, reference may be made to description in the foregoing method embodiments, and details are not provided herein.

In another embodiment of the present invention, the methods for creating an instant messaging discussion group shown in FIG. 5 and FIG. 6 may be methods for creating an instant messaging discussion group that are executed by the units in the client that is shown in FIG. 12 and FIG. 13. For example, step S501 shown in FIG. 5 may be performed by the obtaining module 301 shown in FIG. 12. Step S502 shown in FIG. 5 and step S603 shown in FIG. 6 may be performed by the authentication module 301 shown in FIG. 12. Step S503 shown in FIG. 5 and step S604 shown in FIG. 6 may be performed by the joining module 303 shown in FIG. 12. Step S601 shown in FIG. 6 may be performed by the listening unit 3101 shown in FIG. 13. Step S602 shown in FIG. 6 may be performed by the decoding unit 3102 shown in FIG. 13.

In another embodiment of the present invention, units in the client that are shown in FIG. 12 may be separately or all combined into one or several other units for composition, or some unit (units) thereof may be further divided into multiple functionally smaller subunits for composition. This may implement same operations, without affecting achievement of technical effects of embodiments of the present invention. The foregoing units are divided based on logic functions, and in an actual application, a function of one unit may also be implemented by multiple subunits, or functions of multiple subunits may be implemented by one unit. In another embodiment of the present invention, the client may also include another module. However, in an actual application, these functions may also be implemented with assistance from another unit, and may be implemented in cooperation by multiple units.

According to another embodiment of the present invention, the client shown in FIG. 12 and FIG. 13 may be constructed, and the method for creating an instant messaging discussion group according to an embodiment of the present invention may be implemented by running, on a general-purpose computing device such as a computer that includes processing components and storage components such as a central processing unit (CPU), a random access memory (RAM), and a read-only memory (ROM), a computer program (including program code) that can execute the methods for creating an instant messaging discussion group that are shown in FIG. 5 and FIG. 6. The computer program may be stored on a computer readable storage medium (or a non-transitory computer readable storage medium), and configured in the computing device by using the computer readable storage medium, and run in the foregoing computing device.

In this embodiment of the present invention, another client (including a client that is a non-contact of the first client) other than a first client (that is, a Host client) that initiates creation of an instant messaging discussion group actively obtains a creation identifier broadcasted by the first client, and initiates authentication from the server based on the actively obtained creation identifier. After the authentication succeeds, the instant messaging discussion group is directly joined according to a selection of the first client, thereby not only simplifying an operating process, enabling the first client to directly add a client that is a non-contact of the first client into the instant messaging discussion group, and increasing creation efficiency, but also improving intelligence and competitiveness of an instant messaging application, and enhancing convenience for a user to use the instant messaging application.

The foregoing describes a client according to an embodiment of the present invention in detail.

According to another embodiment of the present invention, an instant messaging application system is further provided.

This embodiment of the present invention further discloses an instant messaging application system, including a server and at least one client. For a structure of the server, reference may be made to relevant description of the embodiment shown in FIG. 10 and FIG. 11; for a structure of the client, reference may be made to relevant description of the embodiment shown in FIG. 8 and FIG. 9, or reference may be made to relevant description of the embodiment shown in FIG. 12 and FIG. 13; and details are not provided herein. It should be noted that, the system in this embodiment may be applied to the foregoing methods.

In this embodiment of the present invention, the Host client can quickly create an instant messaging discussion group with the Client client by using a sound, and initiate a session and a discussion, thereby not only simplifying an operating process, and improving an existing process of creating an instant messaging discussion group, but also increasing creation efficiency, and enhancing convenience for a user to use the instant messaging application.

As disclosed, the disclosed methods can be implemented by an apparatus/device including one or more processor, and a non-transitory computer-readable storage medium having instructions stored thereon. The instructions can be executed by the one or more processors of the apparatus/device to implement the methods disclosed herein. In some cases, the instructions can include one or more units corresponding to the disclosed methods.

Figure 14:
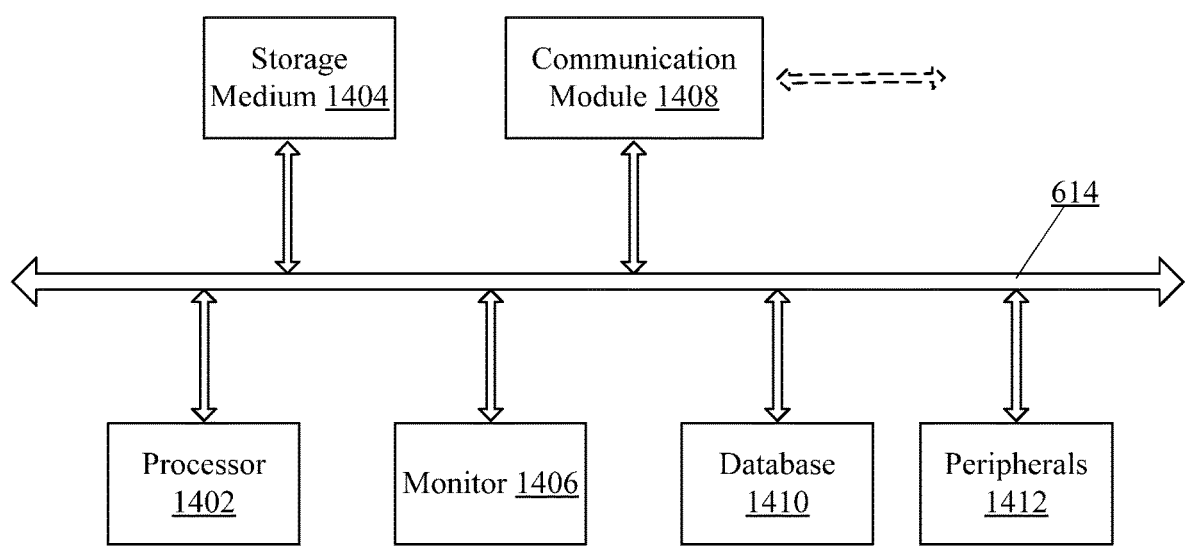
FIG. 14 illustrates an exemplary computing device consistent with the disclosed embodiments.

For example, the disclosed server and/or client may include a computing device capable of implementing the disclosed methods. As shown in FIG. 14, the exemplary computing device 1400 may include a processor 1402, a storage medium 1404, a monitor 1406, a communication module 1408, a database 1410, peripherals 1412, and one or more bus 1414 to couple the devices together. Certain devices may be omitted and other devices may be included.

Processor 1402 may include any appropriate processor or processors. Further, processor 1402 may include multiple cores for multi-thread or parallel processing. The processor 1402 may be used to run computer program(s) stored in the storage medium 1404. Storage medium 1404 may include memory modules, such as ROM, RAM, and flash memory modules, and mass storages, such as CD-ROM, U-disk, removable hard disk, etc. Storage medium 1404 may store computer programs for implementing various disclosed processes, when executed by processor 1402. In one embodiment, storage medium 1404 may be a non-transient computer-readable storage medium having a computer program stored thereon, when being executed, to cause the computer to implement the disclosed methods.

Further, peripherals 1412 may include I/O devices such as keyboard and mouse, and communication module 1408 may include network devices for establishing connections, e.g., through a communication network such as the Internet. Database 1410 may include one or more databases for storing certain data and for performing certain operations on the stored data, such as webpage browsing, database searching, etc.

A person of ordinary skill in the art may understand that all or some of the procedures of the methods of the foregoing embodiments may be implemented by a computer program instructing relevant hardware. The program may be stored in a computer readable storage medium. When the program is executed, the program may include the procedures of the embodiments of the foregoing methods. The storage medium may be a magnetic disk, an optical disc, a read-only memory (ROM), a random access memory (RAM), or the like.

The present disclosure describes a method, a system, a client, and a server for creating an instant messaging discussion group that are provided in embodiments of the present invention in detail. In this specification, specific examples are used to describe the principle and implementation manners of the present disclosure. The foregoing describes the embodiments of the present invention; however, they are not used to limit the scope of the present disclosure, and the scope of the present disclosure is defined by subsequently appended claims. Any modification, equivalent replacement, or improvement made without departing from the spirit and principle of the present disclosure should fall within the protection scope of the claims.

What is claimed is:

1. A method for creating an instant messaging discussion group, comprising:
   sending, by a first client, a request for creating the instant messaging discussion group to a server, and receiving a creation identifier from the server, the creation identifier being allocated by the server in response to the request and for creating the instant messaging discussion group and before identifying members in the instant messaging discussion group;
   broadcasting, by the first client without going through the server, the creation identifier, so that one or more other clients other than the first client executing an instant messaging application system receive the creation identifier and send the creation identifier to the server to initiate authentication from the server according to the creation identifier, including:
      encoding, by the first client, the creation identifier, to obtain audio data; and
      playing, by the first client, the audio data, so that the one or more other clients other than the first client executing the instant messaging application system and physically located within a sound transmission distance range of the first client listen to and decode the audio data to obtain the creation identifier, and send the creation identifier to the server for authentication by comparing the creation identifier received by the server from the one or more other clients with the creation identifier allocated by the server to the first client;
   receiving, by the first client, a client list delivered by the server, the client list including the one or more other clients that have been successfully authenticated by the server based on the creation identifier received from the one or more other clients;
   selecting, by the first client, at least one client from the client list to create the instant messaging discussion group; and
   initiating a discussion session with the at least one client selected from the client list.

2. The method according to claim 1, wherein the creation identifier is used to create an identification (ID) of the instant messaging discussion group, and the creation identifier is a binary text.

3. A method for creating an instant messaging discussion group, comprising:
   allocating, by a server, a creation identifier for creating the instant messaging discussion group in response to a request for creating the instant messaging discussion group sent by a first client and before identifying members in the instant messaging discussion group;
   returning the creation identifier to the first client;
   authenticating, by the server when receiving the creation identifier sent by one or more other clients other than the first client in an instant messaging application system, by comparing the creation identifier received by the server from the one or more other clients with the creation identifier allocated by the server to the first client, the one or more other clients that physically located within a sound transmission distance range of the first client receive audio data played by the first client directly without going through the server, decode the audio data to obtain the creation identifier, and send the creation identifier to the server;

generating, by the server, a client list including the one or more other clients that have been successfully authenticated by the server based on the creation identifier received from the one or more other clients; and sending, by the server, the client list to the first client, so that the first client selects at least one client from the client list to create the instant messaging discussion group and to initiate a discussion session with the at least one client selected from the client list.

4. The method according to claim 3, wherein the step of authenticating, by the server when receiving the creation identifier sent by the one or more other clients other than the first client in the instant messaging application system, the one or more other clients comprises, for each one other client of the one or more other clients:

comparing, by the server, the creation identifier received from the one other client with the creation identifier allocated by the server to the first client; and determining, by the server, that the one other client that sends the creation identifier is successfully authenticated, when the creation identifiers of the one other client and the first client are same, and determining, by the server, that the one other client that sends the creation identifier is unsuccessfully authenticated when the creation identifiers of the one other client and the first client are different.

5. The method according to claim 3, wherein the creation identifier is used to create an identification (ID) of the instant messaging discussion group, and the creation identifier is a binary text.

6. A client, comprising:
a processor; and
a storage medium storing a computer program that, when executed by the processor, causes the processor to:
send a request for creating an instant messaging discussion group to a server, and receive a creation identifier from the server, the creation identifier being allocated by the server in response to the request and for creating the instant messaging discussion group and before identifying members in the instant messaging discussion group;
broadcast the creation identifier without going through the server, so that one or more other clients other than the client in an instant messaging application system receive the creation identifier and send the creation identifier to the server to initiate authentication from the server according to the creation identifier, including:
encoding the creation identifier to obtain audio data; and
playing the audio data, so that the one or more other clients other than the first client executing the instant messaging application system and physically located within a sound transmission distance range of the first client listen to and decode the audio data to obtain the creation identifier, and send the creation identifier to the server for authentication by comparing the creation identifier received by the server from the one or more other clients with the creation identifier allocated by the server to the first client;
receive a client list delivered by the server, the client list including clients that have been successfully authenticated by the server based on the creation identifier;
select at least one client from the client list to create the instant messaging discussion group; and
initiate a discussion session with the at least one client selected from the client list.

7. The client according to claim 6, wherein the creation identifier is used to create an identification (ID) of the instant messaging discussion group, and the creation identifier is a binary text.

8. An instant messaging application system, comprising a server and at least one client according to claim 6.

9. The method according to claim 1, wherein selecting the at least one client from the client list to create the instant messaging discussion group includes selecting all clients in the client list to create the instant messaging discussion group.

10. The method according to claim 1, wherein the at least one client selected from the client list to create the instant messaging discussion group includes at least one client that is not a contact of the first client.

11. The method according to claim 1, wherein encoding the creation identifier to obtain the audio data includes encoding the creation identifier in a radio transmission encoding manner to form the audio data.

12. The method according to claim 1, wherein playing the audio data so that the one or more other clients listen to and decode the audio data includes playing a sound generated based on the audio data using a local sound player of the first client so that the one or more other clients listen to the sound to obtain the audio data and decode the audio data.

* * * * *